United States Patent [19]

van de Wijngaert

[11] 3,729,149

[45] Apr. 24, 1973

[54] TAPE TRANSPORT

[76] Inventor: Louis Assuerus van de Wijngaert, Emmasingel, Eindhoven, Netherlands

[22] Filed: Feb. 18, 1970

[21] Appl. No.: 12,341

[30] Foreign Application Priority Data

Feb. 24, 1969 Netherlands ........................6902878

[52] U.S. Cl. ..................................................242/183
[51] Int. Cl. ............................................G11b 23/12
[58] Field of Search ......................242/182, 183, 184, 242/185

[56] References Cited

UNITED STATES PATENTS

| | | | |
|---|---|---|---|
| 3,078,056 | 2/1963 | Alterman | 242/183 |
| 3,251,048 | 5/1966 | Killen | 242/183 X |
| 3,185,400 | 5/1965 | Maxey | 242/183 |

*Primary Examiner*—George F. Mautz
*Attorney*—Frank R. Trifari

[57] ABSTRACT

A magnetic recording and playback device having a tape-shaped record carrier particularly for use in computer memory systems having tape-bins and a sensing member for signalling the presence of a tape-loop in said tape-bins. The spool motor on the winding-on side being controlled by the weight of the tape in the associated tape-bin, and the spool motor on the winding-off side being controlled by the presence or absence of the last tape-loop in the associated tape-bin.

5 Claims, 3 Drawing Figures

Patented April 24, 1973 3,729,149

2 Sheets-Sheet 1

Figure 1:
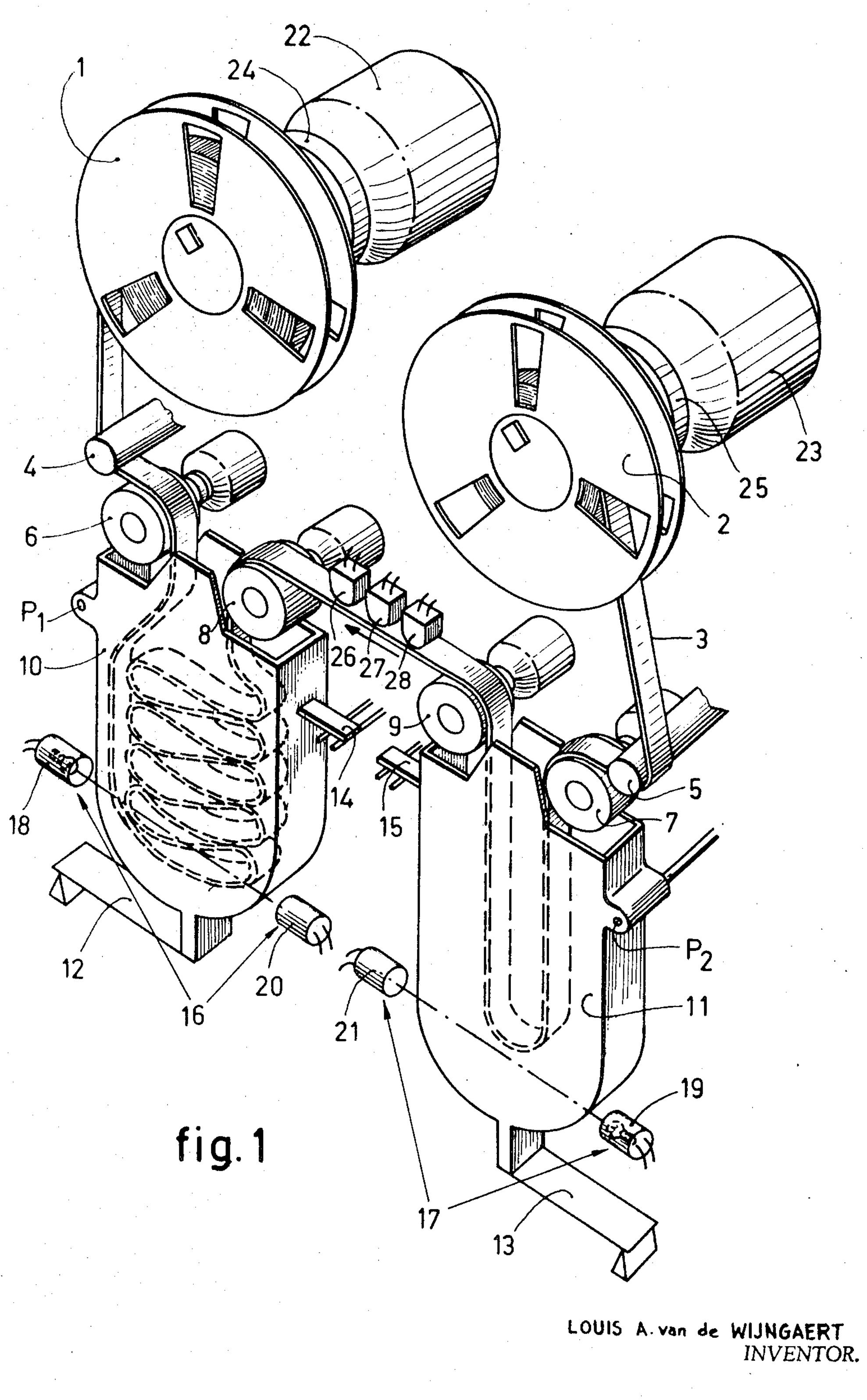

LOUIS A. van de WIJNGAERT
INVENTOR.

BY
Frank R. Trifari
AGENT

LOUIS A. van de WIJNGAERT
INVENTOR.

BY

AGENT

TAPE TRANSPORT

The invention relates to a device for driving tape-shaped record carriers comprising two spools for winding and unwinding respectively the record carrier, which is wound onto the first spool and unwound from the second spool and conversely. A first and second main capstan is provided which is driven by a driving mechanism in relative opposite directions and a first and a second auxiliary capstan driven also in relative opposite directions is also provided. Between the first and second auxiliary capstans and the first and second main capstan respectively first and a second tape-bins respectively are arranged. The first and second tape-bins respectively are provided with a first and a second weighing member respectively for weighing the associated tape-bin together with the tape contained therein. The weighing members are connected to a first and a second switching member respectively, producing a first signal when the tape-stock in the tape-bin exceeds a given value and a second signal when the tape-stock drops below said value..

Such driving systems are frequently used in magnetic tape stores for use in computers, in which the tapes are required to start and stop very rapidly in both senses, for example, within three to four msec, while the write and read rates may be more than 2.5 ms/sec. The tape-bins are provided in order to enable a rapid start and stop, because in the first place only the tape and, as the case may be, the main capstan needs to be accelerated and decelerated. More time is therefore available for providing the required speed to the spool with its high inertia and to the associated driving gear.

In order to be able to use tape-bins of reasonable size the spools have to be driven by motors having a high ratio between the starting torque and the inertia, for example, direct-current motors. These are expensive and require maintenance due to wear of brushes and commutators. A further possibility resides in the use of alternating-current a-synchronous motors, which are cheaper. However, these require difficult and expensive control, because the control-arrangement has to be a triple control.

During the transport of the tape a critical point is reached when one of the main capstans has filled its associated tape-bin and when the maximum tape stock is exceeded. The spool motor has thus received the instruction to reduce this stock, and at the area of the transducers, the tape reverses its direction practically simultaneously. This spool motor stops emptying the tape-bin only when the stock drops below a given minimum. The tape-bin is emptied by the main capstan with practically the same rate so that, when said minimum of the tape stock is attained, the spool motor has to be able to stop within a very short time and to start in the reverse direction. Otherwise rupture of the tape may occur.

An increase in minimum tape stock may be a solution, but this requires larger tape-bins, which is in general undesirable.

A further possibility resides in an increase in deceleration by means of an additional brake, but this requires a zero indicator for the travelling speed, which indicator is usually complicated and hence expensive.

It is, however, possible to use both cheap tape-bins and a cheap spool motor having a lower ratio between starting torque and inertia by providing a sensing member in each tape bin indicating the presence of a single tape-loop in the tape-bin.

It is thus possible to use cheap motors for the spool motor in conjunction with a mechanical brake, which is capable of providing a higher braking torque than the motor so that when the critical point is reached, when the tape stock drops below said minimum, the motor is switched off and the brake is switched on, the speed of the spool motor being thus rapidly reduced. When a main capstan continues drawing tape out of the tape-bin to an extent such that the last tape-loop is drawn out of the tape-bin, this is indicated by the sensing member so that the brake is switched off and the spool motor is switched on in the reverse direction, tape being thus again fed from the spool to the tape-bin.

In one embodiment of a device according to the invention the spool motor is a uniphase a-synchronous motor having a solid iron armature. Such a motor has the advantage that as a function of the number of revolutions the torque is practically constant during the start so that a high acceleration is obtained.

The motors may even be made of smaller size and may therefore be cheaper by using excess-voltage motors as spool motors. This is possible because the motors are switched on only for a short time and sufficient time is available for cooling.

According to a further aspect of the invention, the first and second switching members are connected to an input of a first and a second switch respectively. The switches are in circuit when the first and the second main capstans respectively are switched on. An output of the switches leads to a first input of a first and a second Or-circuit respectively, a second input of which is connected to the first and second sensing members respectively. An output of the OR-circuit leads, via an amplifier if desired, to a first and a second control-member respectively of a first and a second brake respectively arranged on the shaft of the first and of the second spool motor respectively and via a first and a second change-over switch respectively for changing the direction of rotation of the spool motors. The change-over switches are coupled with a third switch for switching on either the first or the second main capstan. The first signal of the first and of the second switching member respectively as well as the signal of the associated sensing member, in the absence of a tape-loop switching off the first and the second brakes respectively and switching on the associated spool motors.

This permits switching the spool motor on the winding side with the aid of the associated weighing device and the spool motor on the unwinding side with the aid of the associated sensing member. The advantage thereof is that at a reversal of the direction of movement of the record carrier on the unwinding side the spool motor is braked so that it stops emptying the associated tape-bin. With the disappearance of the last tape-loop out of the tape-bin this spool motor is switched on in the opposite direction and supplies tape into the tape-bin. The time elapsing between switching-on the brake and switching-on the spool motor is sufficient for stopping the initial movement of the spool motor. At the instant of restarting the spool motor the length of tape is sufficient for avoiding rupture of the tape. An additional advantage is that the marks indicating the end or the beginning of the tape and being provided at a distance of about 6 ms from the end or the beginning respectively, can cause the spool motor to stop in due time by means of a signalling member arranged between the main capstans without the tape leaving the spool.

Moreover, a steady servo-behavior is obtained when the record carrier reciprocates over short distances because then the spool motors can remain in the standstill position, since the tape is capable of reciprocating over a length equal to the length of tape in the tape-bin without the tape-bins becoming too heavy or the tape-loop becoming too short. This arrangement has the disadvantage that if a tape-bin has become too heavy and the spool motor has just started to empty it, at a reversal of the direction of movement of the record carrier for a short time the spool motor is directly switched off so that at the immediate reversal of the direction of movement more tape is fed into the tape-bin than the spool motor has drawn out, so that at a repetition of this process the tape-bin could be clogged after a given time. This disadvantage can be overcome in accordance with a further aspect of the invention by connecting the first and the second switching member to a first input of a first and a second memory respectively, a second input of which is connected via a change-over switch to a voltage source, when the first and the second main capstan respectively is switched on by means of a switch connected to the change-over switch. The output of the first and the second memory respectively leads to a first input of a first and a second Or-circuit respectively, the second input of which is connected to the first and the second sensing member respectively, whilst an output of the Or-circuit leads, if desired through an amplifier, to a first and a second brake respectively. The first and second brakes are arranged on the shaft of the first and the second spool motor respectively and to a first and a second inverter respectively for the direction of rotation of the spool motors. The first and second inverters are also connected to an output of the first and the second memory respectively. The memories provide at the output a first signal, when the signal of the voltage source attend at the first input and the first signal of the associated switching member, attend at the second input,said first signal at the output of the memories switching off the brake and causing the associated spool motor to wind out and dropping off not until the first signal of the switching member disappears and the signal of the associated sensing member in the absence of a tape-loop switches off the brake and causes the associated spool motor to wind in.

Figure 2:
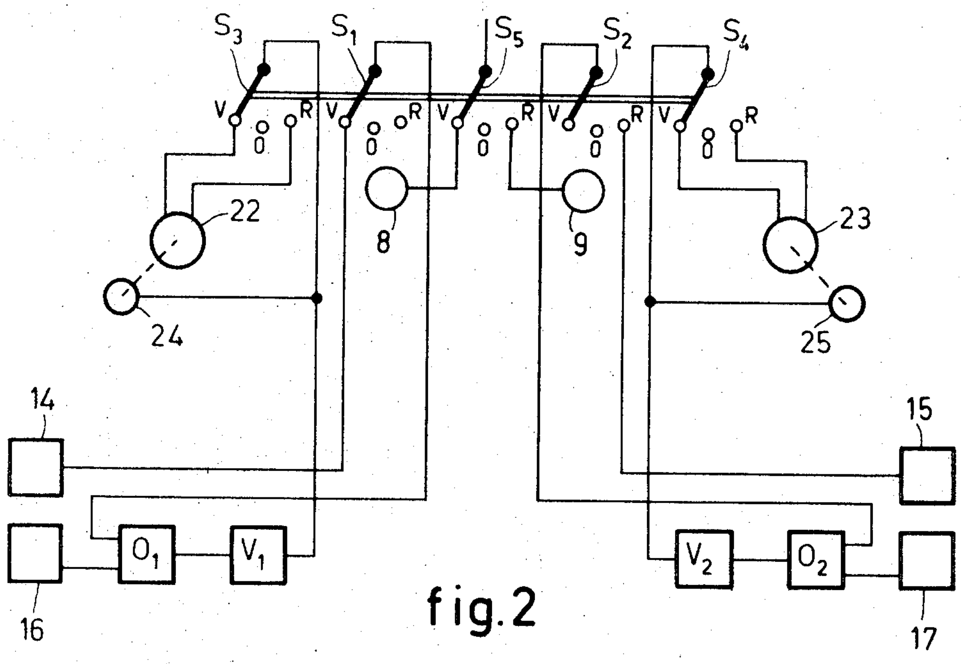
Figure 3:
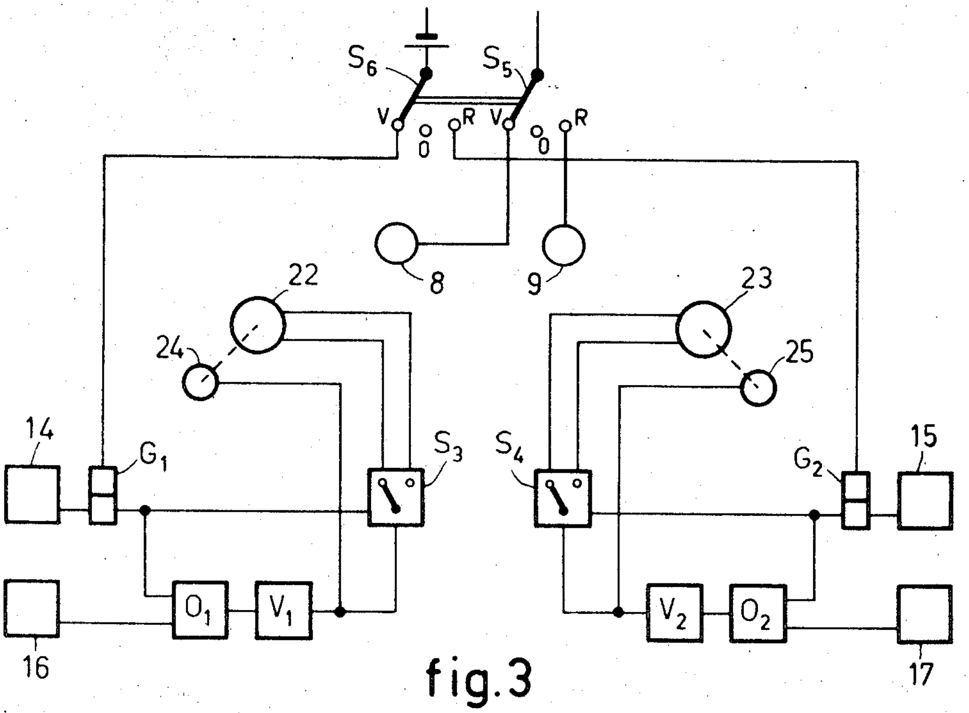

The foregoing will be described more fully with reference to the following Figures, in which FIG. 1 is a perspective view of a device in accordance with the invention, FIG. 2 illustrates a circuitry for controlling the drive of such a device and FIG. 3 shows a similar circuitry provided with a memory.

As is shown in FIG. 1, the device comprises a first spool 1 and a second spool 2, the record carrier 3 being passed from one spool to the other via the guide members 4 and 5, the first and second auxiliary capstans 6 and 7 and the first and second main capstans 8 and 9.

Between the first and second auxiliary capstans 6 and 7 respectively and the first and second main capstans 8 and 9 respectively a first and a second tape-bin 10 and 11 respectively are arranged. These tape-bins 10 and 11 are adapted to tilt about the pivotal points $P_1$ and $P_2$ respectively and are each provided with a weighing device 12 and 13 respectively, formed by a leaf spring and with a switching member 14 and 15 respectively. The switching members provide a first signal when the tape stock in the associated tape-bin exceeds a given value and a second signal when the tape stock drops below said value. Each tape-bin is furthermore provided with a sensing member 16 and 17 respectively, formed in this case by a light source 18 and 19 respectively, projecting the light onto a photoelectric cell 20 and 21 respectively, when no tape-loop is present.

It will be obvious that various embodiments of such sensing members may be designed, for example, capacitive or optical members, operating by reflection of the light ray etc.

The spools are driven by spool motors 22 and 23 respectively, a brake 24 and 25 respectively being arranged on the driving shafts. This brake may be actuated, of course, in various ways, for example, electrically, hydraulically etc.

Said motors 22 and 23 are monophase asynchronous motors having solid iron armature, driven at an excess voltage. The recording, playback, and erasing heads 26, 27 and 28 respectively are arranged between the main capstans 8 and 9.

FIG. 2 illustrates a possible circuitry for driving the device according to the invention, in which the first and the second switching members 14 and 15 are connected to a first and a second switch $S_1$ and $S_2$ respectively. Each switch is closed when its respective main capstan is switched on, only one of the main capstans and its respective switch being operative at any one time. Thus, with the output contact of the switches $S_1$ and $S_2$ respectively leading to a first input of a first and a second OR-circuit $O_1$ and $O_2$ respectively switching member 14 will be connected to the OR-circuit O, via switch $S_1$ when main capstan 8 is switched on, and switching member 15 will be connected via switch $S_2$ to OR-circuit $O_2$ when main capstan 9 is switched on. The second input of OR-circuit $O_1$ and $O_2$ respectively is connected to sensing members 16 and 17 respectively. An output of the OR-circuits $O_1$ and leads to a control-member of a brake 24, and an output of OR-circuit $O_2$ leads to a control member of brake 25. The control members are arranged on the shafts of each of the spool motors 22 and 23 respectively. The connection from the Or-circuit output to the control member is made, if necessary, via an amplifier $V_1$ and $V_2$ respectively and through a first and a second change-over switch $S_3$ and $S_4$ respectively for changing the direction of rotation of the spool motors 22 and 23. The change-over switches $S_3$ and $S_4$ are coupled with the switches $S_1$ and $S_2$ and with a third switch $S_5$ for switching on either the first or the second main capstan 8 and 9 respectively, the first signal of the first and of the second switching member 14 and 15 respectively as well as the signal of the associated sensing member 16 and 17 respectively, in the absence of a tape-loop, switching off the brake 24 and 25 respectively and switching on the associated spool motors 22 and 23 respectively.

If the switches $S_1$ and $S_5$ are in the position for moving the record carrier 3 in the forward direction V and if the first tape-bin 10 is empty, this tape-bin is filled by the first main capstan 8 until it is over-full and thus closes the contacts of the first switching member 14 by its weight against the pressure of the spring 12. The switch $S_1$ is closed so that a signal is passed to the OR-circuit $O_1$. This switches on the first spool motor 22 via the amplifier $V_1$ and the switch $S_3$, so that the spool 1 starts rotating to the right and the first tape-bin 10 is emptied. This is continued until the tape-bin becomes too light and the spring 12 urges the tape-bin upwardly to an extent such that the switching member 14 no longer applies a signal to the OR-circuit $O_1$ so that the motor 22 is again switched off and the brake 24 brakes the spool 1. As long as the movement in the forward direction continues, the tape-bin 10 will alternately become full and then empty by the iterative switching on of the spool motor 22. On the unwinding side a similar process is carried out, but in this case the switching member 15 associated with the tape-bin 11 is not connected to an input of OR-circuit $O_2$. As a result, the tape is drawn by the main capstan 8 out of the tape-bin 11 to an extent such that the last tape-loop is drawn out so that the light of the signalling lamp 21 is projected onto the light-sensitive cell 19, which elements together form the second sensing member 17. A signal is then applied to the second OR-circuit $O_2$, which actuates via the amplifier $V_2$ the control-member of the brake 25 so that the brake 25 is put out of operation and simultaneously the second spool motor 23 is switched on, so that the spool 2 is unwound and the record carrier 3 is fed by the auxiliary capstan 7 into the tape-bin until the tape-loop interrupts the light ray from the incandescent lamp 21 to the light-sensitive cell 19, as a result of which the motor 23 is again switched off and the brake 25 is switched on. This process is repeated until the end of the record carrier is reached. The main capstan 8 is then switched off and the spool 2 winds the record carrier 3 via the auxiliary capstan 7 into the tape-bin 11 to an extent such that the motor 23 is switched off and the brake 25 is switched on. In the reverse direction the operations are carried out in the same way on the understanding that the switches $S_1$ to $S_5$ are changed over and the statements relating to the weighing member 12, the switching member 14, the spool motor 22, the brake 24, the spool 1, the OR-circuit $O_1$, the amplifier $V_1$ now apply to the weighing member 13, the switching member 15, the spool motor 23, the brake 25, the spool 2, the OR-circuit $O_2$ and the amplifier $V_2$, whereas the statements relating to the sensing member 17, the OR-circuit $O_2$, the amplifier $V_2$, the brake 25 and the motor 23, the spool 2 and the auxiliary capstan 7 now apply to the sensing member 16, the OR-circuit $O_1$, the amplifier $V_1$, the brake 24, the motor 22, the spool 1 and the auxiliary capstan 6.

When the record carrier 3 moves in the forward direction, and the tape-bin 10 is too full and the motor 22 receives the instruction to draw the record carrier out of the tape-bin 10, the direction of the record carrier being immediately changed over, the motor 22 being switched off, the brake 24 braking the spool 1 and after the last tape-loop is out of the tape-bin 10 the sensing member 16 produces a signal by which the motor 22 and the brake 24 are energized and the spool 1 unwinds the record carrier with the aid of the auxiliary capstan 6. The motor 22 now has more time available for changing its direction, because practically the whole tape stock in the tape-bin 10 can be unwound before the motor has to reverse its direction for preventing rupture of the tape. This permits constructing the motor 22 (and 23) as an asynchronous motor having a solid iron armature, which is considerably cheaper than the conventional direct-current motors.

It is now also possible to move the record carrier back and forth past the heads 26–28 over short distances without the motors 22 and 23 respectively being switched on, which results in a steady servo-behavior.

The arrangement specified above has the disadvantage that if the tape-bin 10 has become too full during the forward travel of the record carrier 3 and if the motor 22 has just started and the direction of travel of the record carrier is changed for a very short time, the motor 22 is immediately switched off so that after an immediate forward movement of the record carrier more tape is fed into the tape-bin than the motor 22 has drawn out of it so that upon repetition the tape-bin might become clogged after some time.

This disadvantage is overcome by providing a memory of the kind shown in FIG. 3. In this Figure the memories $G_1$ and $G_2$ respectively are arranged between the first and the second switching members 14 and 15 respectively and the first and the second OR-gates $O_1$ and $O_2$ respectively. The output of the memories $G_1$ and $G_2$ leads in addition to the change-over switches $S_3$ and $S_4$ respectively for changing the direction of rotation of the first and of the second spool motors 22 and 23 respectively. The switches $S_1$ and $S_2$ of FIG. 2 are replaced by an additional change-over switch $S_6$, coupled with the switch $S_5$, which switches on either the first or the second main capstan. The switch $S_6$ leads on the one hand to a voltage source A and on the other hand via the change-over contacts to a second input of the first and the second memory $G_1$ and $G_2$ respectively. If the record carrier 3 moves in the forward direction, the switch $S_6$ will connect the voltage source A to the second input of the memory $G_1$. If the tape stock in the tape-bin 10 exceeds a given value, the contacts of the switching member 14 are closed and the switching member applies a first signal to the first input of the memory $G_1$. Owing to the presence of these signals at the two inputs of the memory $G_1$, the output thereof has a first signal which switches change-over switch $S_3$ of the motor 22 to the winding-out direction for removing tape from the respective bin and switches off the brake 24 via the OR-circuit $O_1$ and the amplifier $V_1$ and switches on the spool motor 22 so that the tape is drawn out of the tape-bin 10. As soon as the tape-bin becomes too light, the second signal of the switching member 14 appears at the first input of $G_1$, so that the signal at the output of the memory disappears and the brake is switched on and the spool motor 22 is switched off, while at the same time the change-over switch $S_3$ is set in the winding-in position for filling the respective bin. If during winding-out the direction of the record carrier is changed, the signal of the voltage source A at the second input of the memory $G_1$ disappears, it is true, but this memory can be changed over only at the disappearance of the first signal of the switching member 14 so that the spool motor stops only when the tape-bin 10 is too empty. If the tape is drawn out to an extent such that the last tape-loop disappears, the sensing member 16 applies a signal to the Or-circuit $O_1$ so that via the amplifier $V_1$ the spool motor 22 starts operating to cause refilling of bin 10 and the brake 24 is lifted.

Switching on and off the main capstans 8 and 9 is to denote also "switching on and off" a vacuum in the event of continuously rotating vacuum capstans.

The switches and switching members are to include also electronic switches, for example, logical circuits or light-sensitive or capacitive switches.

What we claimed is:

1. A device for driving tape-shaped record carriers comprising first and second tape carrying spools for winding therebetween said record carriers, said tape being wound onto said first spool and off said second spool and conversely, spool driving means connected to said first and second spools, braking means associated with each of said spool driving means, said braking means being actuated when its associated spool driving means is deactivated, a first and second main capstan and first and second auxiliary capstans mounted between said spools in engagement with said tape for driving same, a driving mechanism connected to said main capstans for driving same in relative opposite directions, means for driving said auxiliary capstans in relative opposite directions, first and second tape-bins mounted between respective main and auxiliary capstans for receiving and storing therein loops of said tape shaped record carrier, a weighing member attached to each of said tape-bins for weighing each said tape-bin with the tape contained therein, a switching member connected to each of said weighing members for producing a first signal when the tape stock stored in the respective tape bin exceeds a given value and a second signal when the tape stock drops below said value, means connected to said switching members responsive to said first and second signals for operating said spool driving means and said braking means so as to cause tape to be supplied or taken up from the respective bin, a sensing member associated with each of said tape-bins for indicating upon actuation thereof the presence of a single loop of tape within the respective bin and means connected to each of said sensing members for causing actuation of the respective spool driving means in a direction to supply tape to said bin.

2. The device according to claim 1 wherein said spool driving means is a monophase a-synchronous motor having a solid iron armature.

3. The device according to claim 1 wherein said spool driving means are excess voltage motors.

4. The device according to claim 1 wherein said means connected to said switching members comprises first and second switches respectively, said switching members being connected to an input of said first and second switches, an OR-circuit connected at one of its inputs to the output of each of said switches, each of said sensing members associated with said respective tape-bins being connected to another input of its respective OR-circuit, a control member for controlling the operation of each of said braking means connected to the output of each of said OR-circuits, changeover switches connected between the output of each respective Or-circuit and each respective spool driving means, a third switch coupled to both of said changeover switches for controlling the operation of either the first or the second main capstan so that either one or the other is operative, said first and second switches being switched on when the first or the second main capstan respectively is switched on, said changeover switches being connected to the output of said OR-circuit for controlling the direction of rotation of each of said spool driving means, whereby when said first signal is produced by a switching member and when said sensing means is actuated said spool driving means associated therewith will be switched on and the associated braking means will be switched off.

5. The device according to claim 1 wherein said means connected to said switching members comprises a memory connected at a first input thereof to each of said switching members, a first changeover switch connected to a second input of both memories, said first changeover switch connected at its other side to a voltage source so as to provide voltage to one of said memories, a switch coupled to said first changeover switch for operating said first or second main capstans when said first changeover switch is connecting said voltage source to the respective memory, an OR-circuit connected at a first input thereof to the output of each of said memories, each of said sensing members being connected to a second input of a respective OR-circuit, each of said braking means being connected to an output of its respective Or-circuit, a second and third changeover switch connected to the output of its respective OR-circuit for controlling the direction of rotation of each of said spool driving means, said second and third changeover switches also being connected to an output of its respective memory, the memories providing at the output a first signal, when the signal of the voltage source at the second input and the first signal of the associated switching member is at the first input, said first signal at the output of the memories switching off the brake and causing the associated spool motor to operate in a direction so as to cause tape winding on its respective spool and to continue operating until the first signal of the switching member disappears and the signal of the associated sensing member in the absence of a tape-loop of predetermined length switches off the brake and causes the associated spool motor to operate in a direction to cause unwinding of the tape from its respective spool.

* * * * *